US012443169B2

(12) United States Patent
Krämer et al.

(10) Patent No.: US 12,443,169 B2
(45) Date of Patent: Oct. 14, 2025

(54) FIELD DEVICE, MEASURING ASSEMBLY AND METHOD OF OPERATION

(71) Applicant: VEGA GRIESHABER KG, Wolfach (DE)

(72) Inventors: Florian Krämer, Mühlenbach (DE); Patrick Heizmann, Oberwolfach (DE); Stefan Allgaier, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 428 days.

(21) Appl. No.: 18/014,208

(22) PCT Filed: Aug. 18, 2020

(86) PCT No.: PCT/EP2020/073078
§ 371 (c)(1),
(2) Date: Jan. 3, 2023

(87) PCT Pub. No.: WO2022/037759
PCT Pub. Date: Feb. 24, 2022

(65) Prior Publication Data
US 2023/0259103 A1    Aug. 17, 2023

(51) Int. Cl.
*G05B 19/418* (2006.01)
(52) U.S. Cl.
CPC . *G05B 19/41805* (2013.01); *G05B 19/41865* (2013.01)
(58) Field of Classification Search
CPC ........ G05B 19/41805; G05B 19/41865; G05B 19/042; G05B 2219/25428; Y02P 90/02
See application file for complete search history.

(56) References Cited

U.S. PATENT DOCUMENTS

| | | | |
|---|---|---|---|
| 11,610,185 B2* | 3/2023 | Gates | H04N 7/181 |
| 12,139,326 B2* | 11/2024 | Hess | G01F 17/00 |
| 2004/0203434 A1* | 10/2004 | Karschnia | G05B 19/0421 |
| | | | 455/67.11 |
| 2007/0028684 A1* | 2/2007 | Benz | G01F 23/284 |
| | | | 73/314 |
| 2012/0247984 A1 | 10/2012 | Jansson et al. | |
| 2019/0364397 A1* | 11/2019 | Rodoni | B65F 1/14 |
| 2020/0103844 A1 | 4/2020 | Victoriano et al. | |

FOREIGN PATENT DOCUMENTS

| | | |
|---|---|---|
| CN | 106915580 A | 7/2017 |
| EP | 2728972 A1 | 5/2014 |
| WO | WO2004038934 A2 | 5/2004 |

OTHER PUBLICATIONS

International Search Report and Written Opinion for parent application PCT/EP2020/073078 issued on Jun. 4, 2021.
CIPO office action for parallel Chinese application 202080104129.0 issued on May 22, 2025.

* cited by examiner

*Primary Examiner* — Christopher E. Everett
(74) *Attorney, Agent, or Firm* — William Gray Mitchell (57) ABSTRACT

A field device with an electronics units with a communication interface for communication with a service unit, at least one measuring transmitter, which is connected to the electronics unit, for detecting a measuring quantity, and at least one triggering element connected to the electronics unit, wherein the electronics unit is designed and configured such that a first service request to the service unit occurs both when a threshold value of the measuring quantity is exceeded and upon an actuation of the triggering element.

18 Claims, 4 Drawing Sheets

FIELD DEVICE, MEASURING ASSEMBLY AND METHOD OF OPERATION

CROSS REFERENCE TO RELATED APPLICATIONS

This patent application claims priority to PCT Patent Application PCT/EP2020/073078, filed on Aug. 18, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a field device, measuring assembly and associated method of operation.

Background of the Invention

A multitude of field devices and methods for operating field devices is known from the prior art. Such field devices may be configured as measuring devices, particularly as filling level or limit level measuring devices, pressure measuring devices or temperature measuring devices, for instance.

Field devices that serve for determining and/or influencing process variables are often used in process automation engineering. Filling level measuring devices, limit level measuring devices and pressure measuring devices with sensors determining the respective process variables filling level, limit level or pressure are examples of such field devices. Such field devices are frequently connected to higher-level units, e.g. to guidance systems or control systems. These higher-level units serve for controlling, visualizing and/or monitoring processes.

In this case, various technical devices that are directly related to a production process are subsumed under the term field device. Thus, field devices may be, in particular, actuators, sensors and measuring transmitters and/or evaluation instruments.

With respect to the terminology as it is used in the present application, higher-level units that are to be associated with the area of control centers are to be clearly distinguished from field devices.

As process measuring devices, field devices have been reliably measuring process-relevant measuring quantities of media in various applications for many years. In the early years of process control engineering, the detected measurement values were transmitted mostly in an analog manner using analog interfaces, e.g. a 4-20 mA interface, from a process measuring device to a higher-level unit, e.g. an evaluation instrument or process control center. In the course of digitalization, this standard was expanded by additionally adding digital signals, e.g. in accordance with the HART standard, which also enabled bidirectional communication between the process measuring device and the process control center. However, one characteristic of such process control systems was that the installations were essentially run in isolated operation. A connection between different process control systems of different sites or different companies or a link-up of the systems to the World Wide Web was not provided.

Field devices with a modular configuration composed on the basis of a modular field device design are known from the prior art. In a modular field device design, a selection may be made from amongst a plurality of combinable sensors, housings, electronics units or electronics modules and operating and/or display units, which are respectively adapted to one another, and a corresponding field device may be composed therefrom. Such a modular field device design is being offered by Vega Grieshaber KG, for example. Generally, a sensor, a corresponding electronics module containing the field device electronics, i.e. particularly a measurement value processing unit as well as an interface with a control unit and optionally with a utilized fieldbus, and various display and/or operating units can be combined. The sensors, electronics modules and display and/or operating units are adapted to one another as well as to various available housings.

The present application also relates to self-contained measuring assemblies, in particular to self-contained filling level or limit level sensors. The self-contained filling level or limit level sensors are preferably configured as radar sensors and—in order to ensure the self-containedness of the sensors—contain, in addition to a measurement sensor for detecting measurement data, a transmitting device for the, preferably wireless, transmission of detected measurement data or measurement values, as well as their own power supply. Preferably, the transmitting device may be a radio module for narrow-band radio technology (LoRa, Sigfox, LTE-M, NB-IOT), which transmits the measurement data or measurement values to a cloud, i.e. a server in the World Wide Web. The power supply unit is preferably configured as a battery or rechargeable battery and may additionally include an energy harvesting module.

Typical areas of use for such field devices include, in particular, inventory management or measuring tasks on mobile containers.

So far, known field devices of the above-mentioned type make it possible to transmit measurement values, so that a higher-level unit triggers a predetermined action based on the acquired measurement value. For example, based on the measurement value of a filling level measuring device, a feed pipe may be closed, or a drainage pipe opened, when a threshold value is exceeded.

The field devices known from the prior art are perceived as being disadvantageous in that the predetermined actions can only be triggered on the basis of a measurement value.

It is the object of the present application to provide a field device, a measuring assembly and a method for operating such a field device which enables a significantly more flexible operation.

This object is accomplished using a field device with the features of the preamble of patent claim 1, a measuring assembly with the features of the preamble of patent claim 10, and a method for operating such a measuring device with the features of the preamble of patent claim 11.

BRIEF SUMMARY OF THE INVENTION

In a preferred embodiment, a field device (3) with an electronics units with a communication interface (5) for communication with a service unit (7), at least one measuring transmitter (9), which is connected to the electronics unit, for detecting a measuring quantity, and at least one triggering element (11) connected to the electronics unit, wherein the electronics unit is designed and configured such that a first service request to the service unit (7) occurs upon an actuation of the triggering element (11).

In another preferred embodiment, the field device (3) as described herein, characterized in that the first service request occurs both upon actuation of the triggering element (11) and when a threshold value of the measuring quantity is exceeded.

In another preferred embodiment, the field device (3) as described herein, characterized in that the field device (3) is configured as a process automation field device.

In another preferred embodiment, the field device (3) as described herein, characterized in that the field device (3) is configured as a filling level measuring device.

In another preferred embodiment, the field device (3) as described herein, characterized in that the electronics unit is configured such that multiple or longer actuation of the triggering element (11) triggers at least one second service request differing from the first one.

In another preferred embodiment, the field device (3) as described herein, characterized in that the field device (3) has a feedback device (13).

In another preferred embodiment, the field device (3) as described herein, characterized in that the triggering element (11) and/or the feedback device (13) is arranged separately from the field device (3).

In another preferred embodiment, the field device (3) as described herein, characterized in that the field device (3) is configured as a self-contained field device.

In another preferred embodiment, the field device (3) as described herein, characterized in that the feedback device (13) is configured visually as, in particular, a light-emitting diode or a display and/or acoustically as, in particular, a loudspeaker.

In another preferred embodiment, the field device (3) as described herein, characterized in that the triggering element (11) and the feedback device (13) are configured in an integrated manner, preferably as a touch display.

In an alternate preferred embodiment, a measuring assembly (1) with a field device (3) according to any one of the preceding claims, wherein the measuring assembly (1) includes a computer (15) with a display (17) on which a virtual representation (19) of the field device (3) can be depicted, wherein a service request is possible by means of the virtual representation (19) of the field device (3).

In another preferred embodiment, a method for operating a sensor according to any one of the preceding claims, characterized in that a first service is requested from the service unit (7) upon actuation of the triggering element (11).

In another preferred embodiment, the method as described herein, characterized in that the first service is requested both when a threshold value of the measuring quantity is reached or exceeded and upon actuation of the triggering element (11).

In another preferred embodiment, the method as described herein, characterized in that the triggering element (11) is triggered manually.

In another preferred embodiment, the method as described herein, characterized in that a service request based on the triggering element (11) is treated with a higher priority than a service request based on the measuring transmitter (9).

In another preferred embodiment, the method as described herein, characterized in that different services can be requested by actuating the triggering element (11) differently.

In another preferred embodiment, the method as described herein, characterized in that a successful service request to the field device (3) is sent a feedback.

In another preferred embodiment, the method as described herein, characterized in that the feedback contains a specific point in time for the execution of the service.

In another preferred embodiment, the method as described herein, with the following steps:
  requesting a service by sending a message to the service unit;
  optically signaling that the service was requested;
  receiving a confirmation message;
  optically signaling that the service was confirmed;
  resetting the optical signaling as soon as the service has been executed.

DETAILED DESCRIPTION OF THE INVENTION

A field device according to the invention with an electronics units with a communication interface for communication with a service unit, at least one measuring transmitter, which is connected to the electronics unit, for detecting a measuring quantity, and at least one triggering element connected to the electronics unit is characterized in that the electronics unit is designed and configured such that a first service request to the service unit occurs upon an actuation of the triggering element.

The field device according to the invention makes it possible to trigger a service request by means of the triggering element, i.e. particularly by an actuation of the triggering element. Thus, it is possible to realize a manual service request, for instance. In one embodiment, the detected measuring quantity may be the filling level of a waste container. If a user of the waste container, e.g. a resident of a house, knows that an increased volume of waste must be expected due to special circumstances, and that the waste container therefore has to be emptied soon, the emptying of the container can be requested manually by actuating the triggering element.

Of course, emptying may also be requested for other reasons, e.g. because strongly smelling waste was deposited, which is to be disposed of soon.

In one variant of the field device, a service request occurs both when a threshold value of the measuring quantity is exceeded and by means of the triggering element, i.e. particularly by an actuation of the triggering element.

In this way, a service can be requested by means of the measuring transmitter, i.e. particularly by reaching a threshold value of the measuring quantity, and thus also by means of the triggering element, i.e. particularly by an actuation of the triggering element. Thus, it is possible, in addition to an automated service request, to manually request that the container be emptied (as an example for a service), e.g. for the above reasons.

If a predefinable filling level is exceeded, then it is clear, e.g. from experience, that the waste container will be full within the next two days and needs to be emptied. In this case, a service request, in the present example an emptying of the container, is requested in an automated manner by the field device.

If a resident of the house knows that the filling level will rise shortly, and that the filling level may presently still be below the threshold value but will soon exceed it, a service request may also take place manually.

The field device may further have a display member for displaying a triggering and/or for confirming a service request and/or for signaling a confirmation from the service unit, i.e. a confirmation from the service unit that the requested service is being executed. Such a display member may be a lamp, particularly in the form of a light-emitting diode or other energy-saving lamp. For example, the triggering may be indicated by the display member flashing, and the confirmation from the service unit may be indicated by the display member being illuminated. The display member could also be implemented in an acoustic manner, e.g. by a loudspeaker.

In one embodiment, the field device may be configured as a process automation field device.

Field devices that serve for determining and/or influencing process variables are often used in process automation engineering. Filling level measuring devices, limit level measuring devices and pressure measuring devices with sensors or measuring transmitters acquiring the respective process variables or measuring quantities filling level, limit level or pressure are examples of such field devices. Such field devices are frequently connected to higher-level units, e.g. to guidance systems, control units or in the present case, a service unit. These higher-level units serve for controlling, visualizing and/or monitoring processes.

In a preferred embodiment, the field device is configured as a filling level measuring device. Filling level measuring devices can be used advantageously in many industrial, but also everyday, applications of stockkeeping and stockpiling but also disposal. In this way, processes can easily be automated and at the same time manually overridden by the user.

For example, stocks can be monitored in this manner, and when stock drops below a minimum, i.e., a minimum filling level, for example, order processes may be triggered as a service. Also, disposal containers can be monitored and an emptying may be requested as a service.

In one variant, the electronics may be configured such that multiple or longer actuation of the triggering element triggers at least one second service request differing from the first one. In the case of a disposal container, for example, a prioritized emptying or a replacement of the container may be requested as a service in this manner with multiple actuations or actuations of different lengths. For example, a distinction can be made between a short actuation of the triggering element of less than 1 second and a long actuation of the triggering element of, for example, more than 2 seconds or more than 3 seconds.

A further service may also be requested in this manner for an order. For example, if a repeat order of the monitored filling material is triggered regularly, a new container containing filling material can be requested with a multiple actuation of the triggering element.

In order to provide for optimum operation, the field device may have a touch display. In the present case, a touch display is to be understood an integrated, touch-sensitive display member, by means of which both inputs through touch and outputs by displaying information are possible. If a touch display is used, there is the option that a specific point in time for an execution of a service is reported back as a confirmation of the service. It is thus possible, for example, to display at what time a disposal container will be emptied or goods for which a repeat order has been placed will be delivered.

The triggering element can be arranged separately from the field device. This means that the triggering element can be arranged at a distance from the field device with the measuring transmitter. This may be necessary, for example, if the field device and the measuring transmitter are not accessible for manual actuation. This may be the case for particularly high containers, for example, or if the field device is arranged inside a container.

In an advantageous embodiment, the field device is configured as a self-contained field device.

The present embodiment substantially relates to self-contained field devices, in particular to self-contained filling level or limit level sensors. The self-contained filling level or limit level sensors are preferably configured as radar sensors and—in order to ensure the self-containedness of the sensors—contain, in addition to a measurement sensor for detecting measurement data, a transmitting device for the, preferably wireless, transmission of detected measurement data or measurement values, as well as their own power supply. Preferably, the transmitting device may be a radio module for narrow-band radio technology (LoRa, Sigfox, LTE-M, NB-IOT), which transmits the measurement data or measurement values to a cloud, i.e. a server in the World Wide Web. The power supply unit is preferably configured as a battery or rechargeable battery and may additionally include an energy harvesting module.

Typical areas of use for such field devices include, in particular, inventory management or measuring tasks on mobile containers. In this context, for attachment to a container means that the measuring assembly can be attached to the container in a, in particular, non-invasive manner, i.e. non-destructively, i.e. in particular without bore holes or other actions damaging the container.

In this context, the communication interface with the service unit may be said radio interface. Thus, both a transmission of measurement values and the service request may take place via the radio interface.

As was already shown, the field device may have a feedback device that makes it possible to confirm a successful request for service and—depending on the configuration—report back a successful service request and/or a specific point in time for the execution of the service.

A measuring assembly according to the invention with a field device as described above is characterized in that the measuring assembly includes a computer with a display on which a virtual representation of the field device and/or of the triggering element can be depicted, wherein a service request is possible by means of the virtual representation of the field device.

A service can be requested in a simple manner from the computer of the measuring system by means of a corresponding virtual representation of the field device or the triggering element. For example, the computer may be configured as a desktop computer, a tablet computer, server, cloud computing or mobile phone on which a corresponding program runs for displaying the virtual representation and communication with the field device. The communication with the field device may take place via a radio link, for example, which is established via a radio module of the computer.

A method according to the invention for operating a field device according to the above description is characterized in that a service occurs from the service unit upon actuation of the triggering element.

Thus, it can be accomplished by means of the method according to the invention that the service can be requested individually.

In one embodiment of the method, a service request occurs both when a threshold value of the measuring quantity is reached or exceeded and in the case of an actuation of the triggering element.

Thus, the service can be requested both in an automated manner as well as manually.

In one variant of the method, the triggering element is triggered manually. For example, a manual triggering may take place by actuating the button or a virtual button. A service can thus be requested simply and intuitively. The service request via a button may be protected by an integrated fingerprint sensor or activation with a certain key sequence, for example, in order to offer protection against an unauthorized request.

It may also be provided that a service request based on a triggering element is treated with a higher priority than a service request based on the measuring element. In this case, a higher priority may mean that the requested service is executed earlier, for example.

In one variant of the method, different services can be requested by actuating the triggering element differently. In this case, it may be provided that a single actuation of the triggering element requests the one service, and a multiple actuation of the triggering element within a predetermined time, a different service. With respect to the action taken, the different service may match the first service but be executed with a higher priority.

For example, a single actuation of the triggering element may trigger an emptying of a disposal container within 2 working days, and multiple actuation of the triggering element may trigger an emptying of the disposal container within 24 hours.

Alternatively, a replacement of the disposal container may be requested instead of an emptying of the disposal container by means of a different actuation of the triggering element, e.g. keeping it depressed for at least a predetermined duration, e.g. at least 5 seconds.

In order to increase the reliability and ease of use, a feedback may be sent to the field device in the event of a successful service request. This means that, for example, a successful transmission of the service request and/or a successful planning of the service can be confirmed. In the case of a lamp as a feedback device, a successful transmission of the service request can be signaled by the lamp flashing, and a successful scheduling of the service can be signaled by the lamp being illuminated.

In the case of a display as a feedback device, the feedback may contain a specific point in time for the execution of the service, which is shown on the display. For example, it may be reported when an emptying of a disposal container is scheduled.

For this purpose, the method may have the following steps:
  requesting a service by sending a message to the service unit;
  optically signaling that the service was requested;
  receiving a confirmation message;
  optically signaling that the service was confirmed;
  resetting the optical signaling as soon as the service has been executed.

Thus, a high level of ease of use can be accomplished by means of simple optical feedbacks. The optical feedback may also be used by the sensor itself in order to visualize the sensor status or the filling level by means of a color gradient, for example.

The type of feedback and of the request can be designed to be freely configurable. For example, the manner of optically displaying the feedback may be configured in different ways, e.g. by different flashing sequences and/or colors. Different actuations of the request unit may also be provided. For example, a short depression of the button or a long depression of the button or different sequences may request different services.

Preferred embodiments, features and properties of the proposed field device correspond to those of the proposed method and vice versa.

Advantageous embodiments and variants of the invention become apparent from the dependent claims and the following description. The features cited individually in the dependent claims may be combined in any technologically meaningful manner both with each other and with the features presented in more detail in the following description, and can represent other advantageous embodiment variants of the invention.

DETAILED DESCRIPTION OF THE FIGURES

Figure 1:
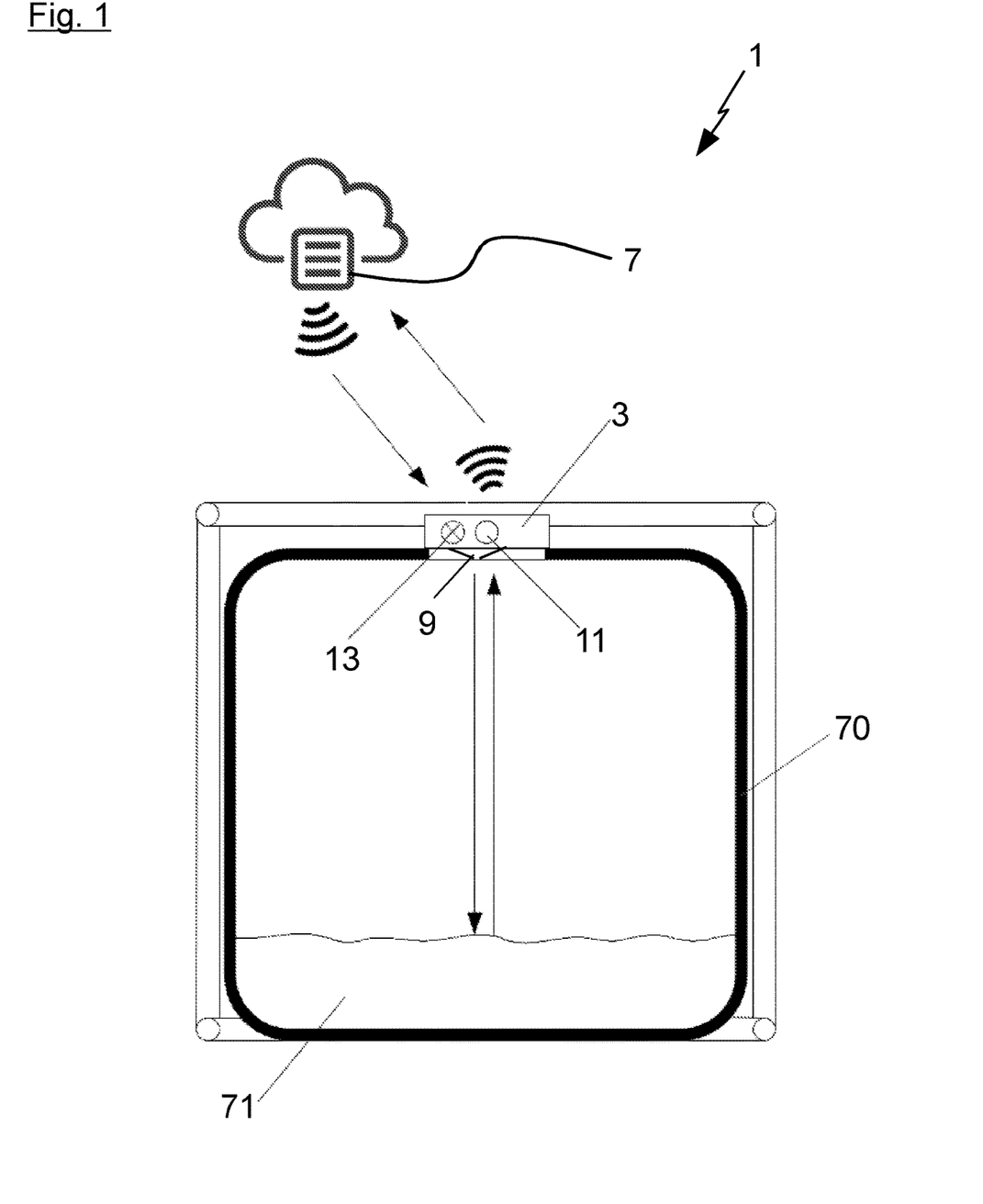
FIG. 1 is a line drawing evidencing a measuring assembly with a field device according to the present application.

FIG. 1 shows a measuring assembly 1 with a field device 3 according to the present application.

In the present exemplary embodiment, the field device 3 is configured as a filling level measuring device and attached to a container 70, in the present case an intermediate bulk container (IBC) for the purpose of filling level measurement. A filling material 71, whose filling level is to be monitored by means of the filling level measuring device 3, is disposed in the container 70. In order to stabilize the container 70, which is made from plastic, the latter is disposed in a wire cage that renders the containers 70 stackable and transportable by means of floor conveyor systems.

The filling level measuring device 3 is configured as a self-contained radar level measuring device containing a measuring transmitter 9, which is configured as a radar sensor and of which an antenna cone is visible in the present exemplary embodiment. For this purpose, the filling level measuring device 3 has an integrated power supply unit and a communication interface 5 for communication with higher-level units, which is configured as a radio interface. In the present exemplary embodiment, such a higher-level unit is depicted as a service unit 7.

For example, the service unit 7 may be configured as a server in a data network, in which the field device 3 can request a service via the communication interface 5. For example, such a service may be an emptying of the container 70, if the container 70 is a disposal container. If the container 70 is a storage container, the service may be a filling or a replacement of the empty container 70 with a full container.

In the present exemplary embodiment, an emptying of the container 70 is requested as a service if a filling level of the filling material 71 exceeds a predetermined threshold value, which in the present exemplary embodiment corresponds to 90% of an admissible filling height of the container 70.

In addition to the measuring transmitter 9, the field device 3 has a triggering element 11 configured as a button, by means of which the above-described service, i.e. the emptying of the container 70, can also be requested manually, i.e. by depressing the button 11.

If the service is requested from the service unit 7 by the field device 3, this is signaled via a feedback device 13 configured as a light-emitting diode. In the present exemplary embodiment, the light-emitting diode 13 starts to flash immediately after the request for the service by the field device 3, thus signaling that a service request was sent from the field device. The request for service is received by the service unit 7 and scheduled in accordance with the available resources; if the service units 7 determines that the requested service can be executed, this is confirmed by the service unit 7, and this confirmation is sent to the field device 3. Once the confirmation was received by the field device 3, this is signaled by the light-emitting diode 13 no longer flashing, but now being illuminated permanently. Once the requested service was actually executed, the light-emitting diode 13 goes off again and thus signals that no service is currently requested by the field device.

Figure 2:
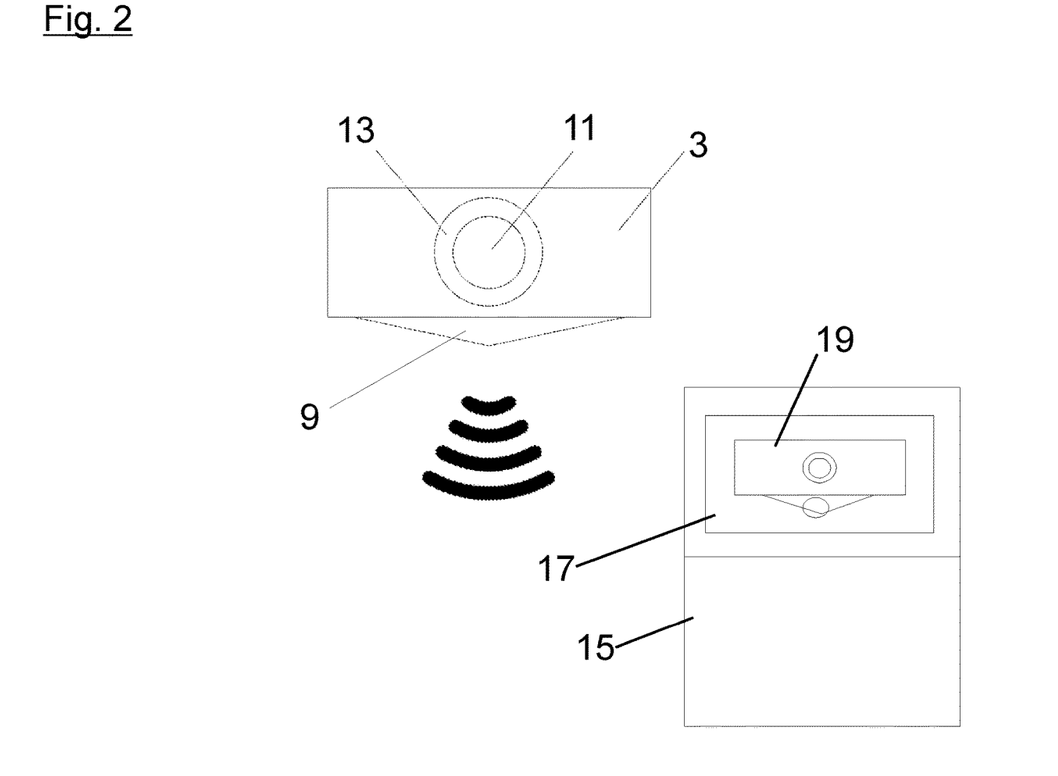
FIG. 2 is a line drawing evidencing a first exemplary embodiment of a field device according to the present application.

FIG. 2 shows a first exemplary embodiment of a field device 3 according to the present application.

The field device 3 according to FIG. 2 is also configured as a filling level measuring device, and in the present case as a self-contained radar level measuring device. As in the field device 3 described in relation to FIG. 1, the field device 3 according to FIG. 2 has a radar sensor as a measuring transmitter 9. The radar sensor 9 emits short-wave electromagnetic radiation in the direction towards the filling material, as is shown in FIG. 1, and determines a distance of the filling material surface from the radar sensor, and thus a filling level in the container 70, on the basis of an evaluation of the radar waves reflected by the filling material.

In contrast to the field device 3 according to FIG. 1, the triggering element 11 in the present exemplary embodiment is combined with the feedback device 13 such that the triggering element 11 configured as a button is surrounded by a ring-shaped lamp unit as a feedback device 13. In the exemplary embodiment depicted in FIG. 2, the lamp unit is configured such that a plurality of different colors can be output for signaling. Thus, a service request is signaled by the feedback device 13 being illuminated in yellow, and a confirmation by the service unit 7 by the feedback device 13 being illuminated in green.

In the exemplary embodiment shown in FIG. 2, there is also depicted a computer 15 which is connected to the field device 3 via a short-distance radio module link, e.g. Bluetooth. A virtual representation 19 of the field device 3 is depicted on a display 17 of the computer 15 and, in accordance with the status of the field device 3, also shows the current status of a service request on the display 17. In addition to a manual triggering of the service request by depressing the button 11, a service request in this exemplary embodiment may also take place by clicking on the button in the virtual representation 19. In the present exemplary embodiment, the computer 15 is configured as a laptop, but may also be configured as a tablet computer, a smartphone or a manufacturer-specific, proprietary terminal device, depending on the required scenario.

Figure 3:
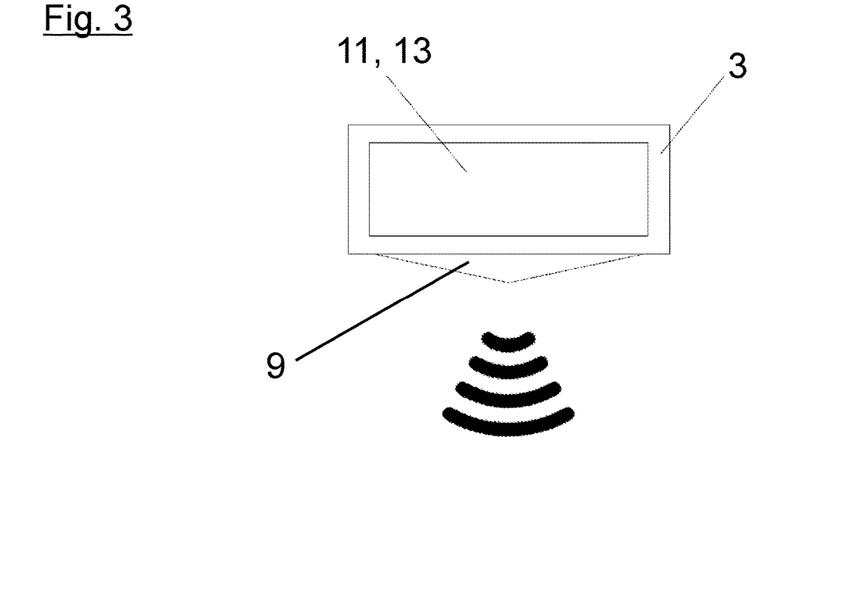
FIG. 3 is a line drawing evidencing a second exemplary embodiment of a field device according to the present application.

FIG. 3 shows a second exemplary embodiment of a field device 3 according to the present application.

In its basic structure, the field device 3 according to FIG. 3 matches the field device according to FIG. 2, wherein, in the exemplary embodiment shown here, the triggering element 11 and the feedback device 13 are combined and integrated into a touch-sensitive display unit. Both a manual request for service by touching the touch-sensitive display unit and a confirmation via the display may take place by means of a touch-sensitive display unit. In addition to simple signaling by flashing or being illuminated in different ways, a specific execution time for the requested service can be reported and displayed in clear text by means of such a display unit. A combination with a computer 15, as it is shown in the context of FIG. 2, is not depicted in the present exemplary embodiment but may also be arranged if needed.

Figure 4:
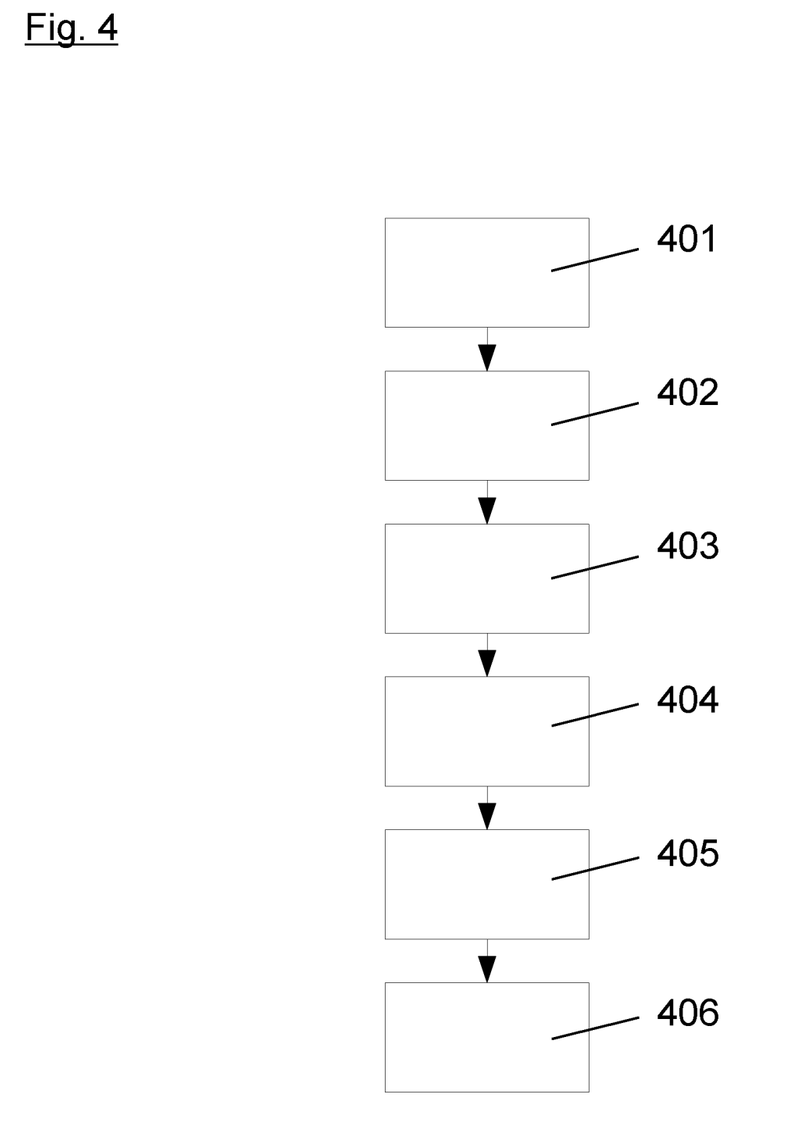
FIG. 4 is a line drawing evidencing a first possible flow of a method for operating a measuring assembly with only one field device according to the present application.

FIG. 4 shows a first possible flow of a method for operating a measuring assembly according to FIG. 1 with a field device according to any one of the FIG. 1-3.

In a first step 401, a service, in the present exemplary embodiment an emptying of the container 70, is requested. In this case, the service may be requested both in an automated manner by the field device 3, if the latter determines, by means of the measuring transmitter 9, that the filling material 71 exceeds or has dropped below a predetermined filling level in the container, or manually by actuating the triggering element 11.

In a first variant—with a field device as it is shown in the FIG. 1 or 2—the feedback device 13 signals, by flashing or being illuminated in a predetermined color, that the service was requested. In a second variant—with a field device as it is shown in FIG. 3—the display of the touch-sensitive display unit signals that a service was requested, and the time of the service request is also shown on the display.

In a third step 403, the service is confirmed by the service unit 7, and in a fourth step 404, the confirmation is shown on the field device 3. In a first variant, this is done by permanent illumination of the feedback device 13, optionally in a predetermined color, in the second variant by displaying the confirmation on the display with a notification of a time for the execution of the service.

Finally, in a fifth step 405, the requested service is executed and the execution of the service is acknowledged. The execution of the service and the acknowledgement is signaled on the field device 3 in a sixth step 406 by the feedback device 13 being turned off, i.e., in particular, not being illuminated, or displaying nothing, or being deactivated.

Figure 5:
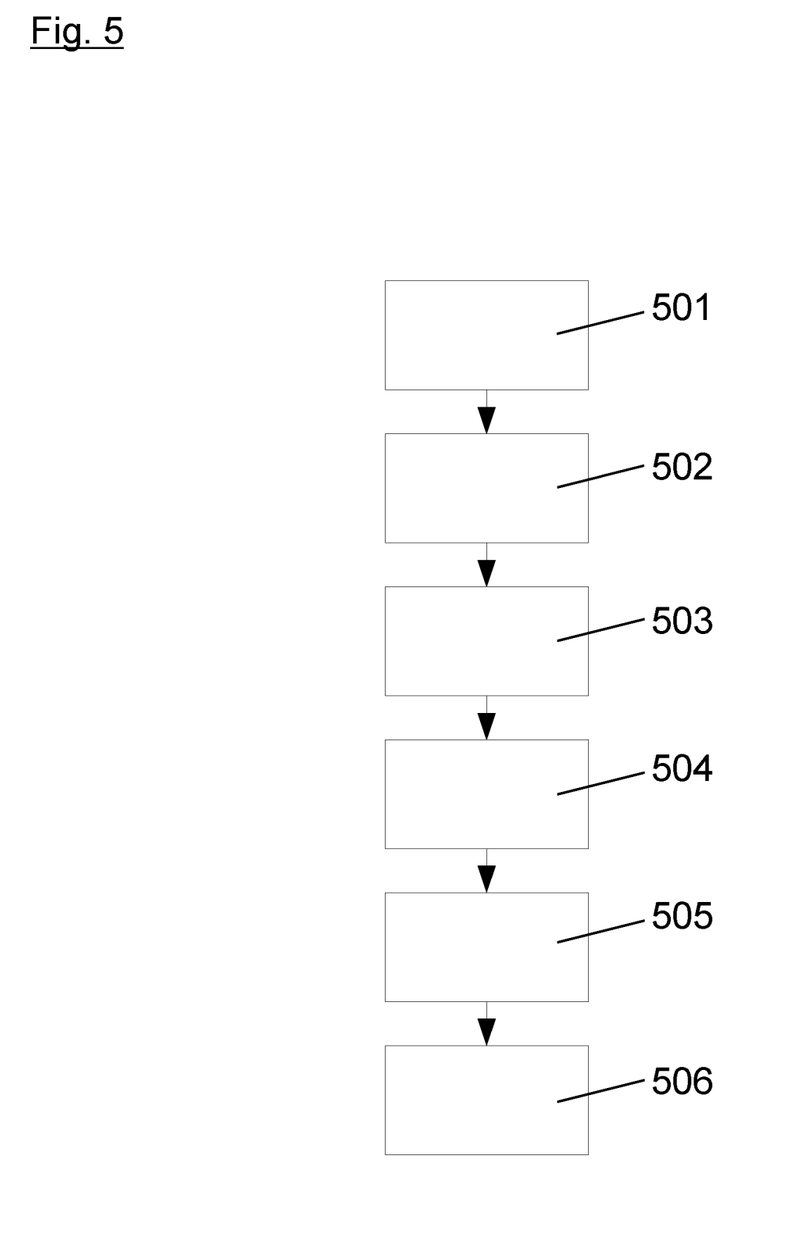
FIG. 5 is a line drawing evidencing a second possible flow of a method for operating a measuring assembly with a plurality of field devices according to the present application.

FIG. 5 shows a second possible flow of a method for operating a measuring assembly 1 with a plurality of field devices 3 according to the present application. In this case, the several field devices may be attached to one container 70 or several containers 70, wherein a requested service is executed in each case jointly for all containers 70.

In a first step 501, a service is requested by one of the field devices 3, wherein the request for service—as in the method explained in FIG. 4—may occur due to a measurement value, e.g. due to a threshold value being reached, or manually by actuation of the triggering element 11 of one of the field devices 3.

In a second step 502, the service request is signaled by the feedback device 13, wherein this may take place by flashing, being illuminated in a predetermined color, or displaying the service request together with the time of the service request, depending on the type of the feedback device 13.

Since the field devices 3 in the present exemplary embodiment also communicate amongst one another, the service request is signaled by a field device 3 via the feedback device 13 to all field devices 3.

If the requested service is confirmed in a third step 503 by the service unit 7, then the successfully transmitted confirmation is signaled in a fourth step 504 to all field devices 3 by the feedback device 13, wherein this may occur—again dependent on the type of feedback device 13—by illumination, optionally illumination in a predetermined color, or displaying the confirmation with a notification of the time for the service request. In a fifth step 505, the requested service is executed on all containers concerned, and acknowledged. The successful execution of the service and the acknowledgement is signaled in a sixth step by the feedback device 13, wherein, also in this exemplary embodiment, this is done by the feedback devices being turned off, i.e., in particular, not being illuminated, by them displaying nothing, or being deactivated.

It may be noted here that different services as well as an identical service with a different priority may be requested by one and the same field device. In each case, this may take place both in an automated manner, e.g. if predetermined threshold values are exceeded, or manually, e.g. by depressing the triggering element 11 once or several times, or keeping it depressed.

For example, an emptying of the container 70 may be requested with a normal priority upon reaching a filling level of 80%. If a filling level of 90% is then reached prior to the requested service having been executed, i.e. prior to the container 70 having been emptied, then the same service, but now with a raised priority, may be requested by the same field device. In this context, a raised priority with respect to the service request may mean, for example, that the container 70 has to be emptied within a maximum predetermined time. In the case of a manual request for service, the above-described different priorities may also be taken into consideration. For example, a service request with a normal priority may take place by depressing the triggering device once. A service request with a higher priority may be requested by depressing the triggering element 11 once, for example. By keeping the triggering device 11 depressed for a time of, for example, 5 seconds, a third service may be requested, e.g. a replacement of the container 70.

It may be noted here that the above-described services are to be understood only as examples, and may be adapted to the intended use of the respective field device 3.

LIST OF REFERENCE NUMBERS

1 Measuring assembly
3 Field device/filling level measuring device
5 Communication interface
7 Service unit
9 Measuring transmitter/radar sensor
11 Triggering element/button
13 Feedback unit
15 Computer
17 Display
19 Virtual representation
70 Container
71 Filling material Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:
1. A field device with
an electronics units with a communication interface for communication with a service unit,
at least one measuring transmitter, which is connected to the electronics unit, for detecting a measuring quantity, and
at least one triggering element connected to the electronics unit,
wherein the electronics unit is designed and configured such that a first service request to the service unit occurs both upon an actuation of the triggering element and when a threshold value of the measuring quantity is exceeded,
wherein services are requested with different priorities in such a manner that prioritizing takes place in an automated manner if predetermined threshold values are exceeded and manually by depressing the triggering element once or several times or keeping it depressed.

2. The field device according to claim 1, wherein the field device is configured as a process automation field device.

3. The field device according to claim 1, wherein the field device is configured as a filling level measuring device.

4. The field device according to claim 1, wherein the electronics unit is configured such that multiple or longer actuation of the triggering element triggers at least one second service request differing from the first one.

5. The field device according to claim 1, wherein the field device has a feedback device.

6. The field device according to claim 5, wherein the feedback device is configured visually as a light-emitting diode or a display and/or acoustically as, in particular, a loudspeaker.

7. The field device according to claim 5, wherein the triggering element and the feedback device are configured in an integrated manner as a touch display.

8. The field device according to claim 1, wherein the triggering element and/or the feedback device is arranged separately from the field device.

9. The field device according to claim 1, wherein the field device is configured as a self-contained field device.

10. A measuring assembly with a field device according to claim 1, wherein the measuring assembly includes a computer with a display on which a virtual representation of the field device can be depicted, wherein a service request is possible by means of the virtual representation of the field device.

11. A method for operating a sensor according to claim 1, wherein a first service is requested from the service unit upon actuation of the triggering element.

12. The method according to claim 11, wherein the first service is requested both when a threshold value of the measuring quantity is reached or exceeded and upon actuation of the triggering element.

13. The method according to claim 11, wherein the triggering element is triggered manually.

14. The method according to claim 11, wherein a service request based on the triggering element is treated with a higher priority than a service request based on the measuring transmitter.

15. The method according to claim 11, wherein different services can be requested by actuating the triggering element differently.

16. The method according to claim 11, wherein a successful service request to the field device is sent a feedback.

17. The method according to claim 16, wherein the feedback contains a specific point in time for the execution of the service.

18. The method according to claim 11, with the following steps:
- requesting a service by sending a message to the service unit;
- optically signaling that the service was requested;
- receiving a confirmation message;
- optically signaling that the service was confirmed;
- resetting the optical signaling as soon as the service has been executed.

* * * * *